(12) United States Patent
Park et al.

(10) Patent No.: US 8,766,581 B2
(45) Date of Patent: Jul. 1, 2014

(54) POWER FACTOR CORRECTION CIRCUIT, AND POWER SUPPLY DEVICE AND MOTOR DRIVING DEVICE HAVING THE SAME

(75) Inventors: Min Gyu Park, Gyunggi-do (KR); Kee Ju Um, Gyunggi-do (KR); Bum Seok Suh, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 231 days.

(21) Appl. No.: 13/324,340

(22) Filed: Dec. 13, 2011

(65) Prior Publication Data

US 2013/0069569 A1  Mar. 21, 2013

(30) Foreign Application Priority Data

Sep. 16, 2011 (KR) .................. 10-2011-0093472

(51) Int. Cl.
*G05F 1/563* (2006.01)
(52) U.S. Cl.
USPC ........... 318/438; 323/206; 323/223; 323/205; 323/214; 323/208; 323/302; 323/233; 323/218; 323/209; 323/211; 363/21.1; 363/21.18
(58) Field of Classification Search
USPC .......... 318/438; 323/234, 290, 223, 205, 212, 323/206, 214, 302, 208, 233, 218, 209, 323/211.241, 283, 322; 363/21.1, 21.18
See application file for complete search history.

(56) References Cited

U.S. PATENT DOCUMENTS

| | | | | |
|---|---|---|---|---|
| 5,396,165 A | * | 3/1995 | Hwang et al. ................. | 323/210 |
| 5,418,704 A | * | 5/1995 | Hua et al. .................... | 323/282 |
| 5,636,114 A | * | 6/1997 | Bhagwat et al. ........... | 363/56.12 |
| 6,259,235 B1 | * | 7/2001 | Fraidlin et al. .............. | 323/222 |
| 7,888,922 B2 | * | 2/2011 | Melanson .................... | 323/282 |
| 7,919,950 B2 | * | 4/2011 | Uno et al. .................... | 323/207 |
| 8,125,205 B2 | * | 2/2012 | Chandrasekaran et al. .. | 323/282 |
| 8,148,853 B2 | * | 4/2012 | Saligram et al. ............. | 307/126 |
| 8,441,822 B2 | * | 5/2013 | de Groot et al. ............. | 363/89 |
| 8,477,514 B2 | * | 7/2013 | Artusi et al. ............. | 363/21.01 |
| 8,502,520 B2 | * | 8/2013 | Chandrasekaran ........... | 323/362 |
| 8,520,414 B2 | * | 8/2013 | Garrity et al. ............ | 363/21.14 |
| 2010/0270984 A1 | * | 10/2010 | Park et al. .................... | 323/211 |
| 2011/0001362 A1 | | 1/2011 | de Groot et al. | |
| 2011/0260631 A1 | * | 10/2011 | Park et al. .................... | 315/165 |

FOREIGN PATENT DOCUMENTS

KR  10-2007-0116240 A  12/2007

OTHER PUBLICATIONS

Office Action issued in Korean Patent Application No. 10-2011-0093472 dated Feb. 25, 2013.

\* cited by examiner

*Primary Examiner* — Rita Leykin
(74) *Attorney, Agent, or Firm* — McDermott Will & Emery LLP (57) ABSTRACT

There are provided a power factor correction circuit capable of transferring extra power to a ground before performing switching for a power factor correction to thereby reduce a switching loss generated in switching for a power factor correction, and a power supply device and a motor driving device having the same. The power factor correction circuit includes: a main switch switching input power to adjust a phase difference between a current and a voltage of the input power; and an auxiliary switch switched on before the main switch is switched on, to thereby form a transmission path for extra power of the main switch.

21 Claims, 8 Drawing Sheets

POWER FACTOR CORRECTION CIRCUIT, AND POWER SUPPLY DEVICE AND MOTOR DRIVING DEVICE HAVING THE SAME

CROSS-REFERENCE TO RELATED APPLICATIONS

This application claims the priority of Korean Patent Application No. 10-2011-0093472 filed on Sep. 16, 2011, in the Korean Intellectual Property Office, the disclosure of which is incorporated herein by reference.

BACKGROUND OF THE INVENTION

1. Field of the Invention

The present invention relates to a power factor correction circuit having an auxiliary switch, and a power supply device and a motor driving device having the same.

2. Description of the Related Art

Recently, governments around the world have promoted efficient energy use in conformity with energy efficiency policies, and in particular, efficient energy use is widely recommended in electronic products and home appliances.

Inefficient energy use, according to such governmental recommendations, a power supply device supplying power to electronic products, home appliances, or the like, may employ an improvement circuit.

The improvement circuit may be, for example, a power factor correction circuit. A power factor correction circuit is a circuit for switching input power and adjusting a phase difference (power factor) between a current and a voltage of the input power to effectively transfer power to a rear stage. However, the power factor correction circuit may have a switching loss, since the input power is switched.

Meanwhile, electronic products, home appliances, and the like, mostly employ a motor in order to perform a pre-set operation, and, in order to drive such motor, appropriate power should be supplied and a power factor correction circuit for enhancing energy efficiency should be applied to the power supply device to switch input power to adjust the phase difference between the current and voltage of the input power. In this respect, however, a switching loss may occur when the input power is switched.

SUMMARY OF THE INVENTION

An aspect of the present invention provides a power factor correction circuit capable of transferring extra power to a ground before performing switching for a power factor correction to thereby reduce switching loss occurring during switching for a power factor correction, and a power supply device and a motor driving device having the same.

According to an aspect of the present invention, there is provided a power factor correction circuit including: a main switch switching input power to adjust a phase difference between a current and a voltage of the input power; and an auxiliary switch switched on before the main switch is switched on, to thereby form a transmission path for extra power of the main switch.

The power factor correction circuit may further include: a first inductor connected between an input power terminal and the main switch to accumulate or discharge energy according to switching of the main switch; and a second inductor connected between a connection terminal of the main switch and the first inductor and the auxiliary switch to adjust the amount of a current flowing in the auxiliary switch when the auxiliary switch is switched on.

The power factor correction circuit may further include: a diode providing a transmission path for power discharged from the first inductor according to switching of the main switch; and a capacitor stabilizing the power transferred from the diode.

The input power may be rectified power.

The auxiliary switch may be switched on and switched off before the main switch is switched on, or is switched on before the main switch is switched on, and switched off after the main switch is switched on.

The power factor correction circuit may further include: a controller providing a switching control signal for controlling switching of the main switch and the auxiliary switch.

The main switch and the auxiliary switch may be at least one of an insulated gate bipolar transistor (IGBT) and a metal oxide semiconductor field-effect transistor (MOS-FET).

According to another aspect of the present invention, there is provided a power supply device including: a power factor correction circuit including a main switch switching input power to adjust a phase difference between a current and a voltage of the input power and an auxiliary switch switched on before the main switch is switched on, to thereby form a transmission path for extra power of the main switch; a power conversion unit switching power from the power factor correction circuit to convert the power into pre-set power; and a switching controller controlling power switching of the power conversion unit.

According to another aspect of the present invention, there is provided a motor driving device including: a power factor correction circuit including a main switch switching input power to adjust a phase difference between a current and a voltage of the input power and an auxiliary switch switched on before the main switch is switched on, to thereby form a transmission path for extra power of the main switch; a driving unit switching power from the power factor correction circuit to drive a motor; and a driving controller controlling power switching of the driving unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings.

Figure 1:
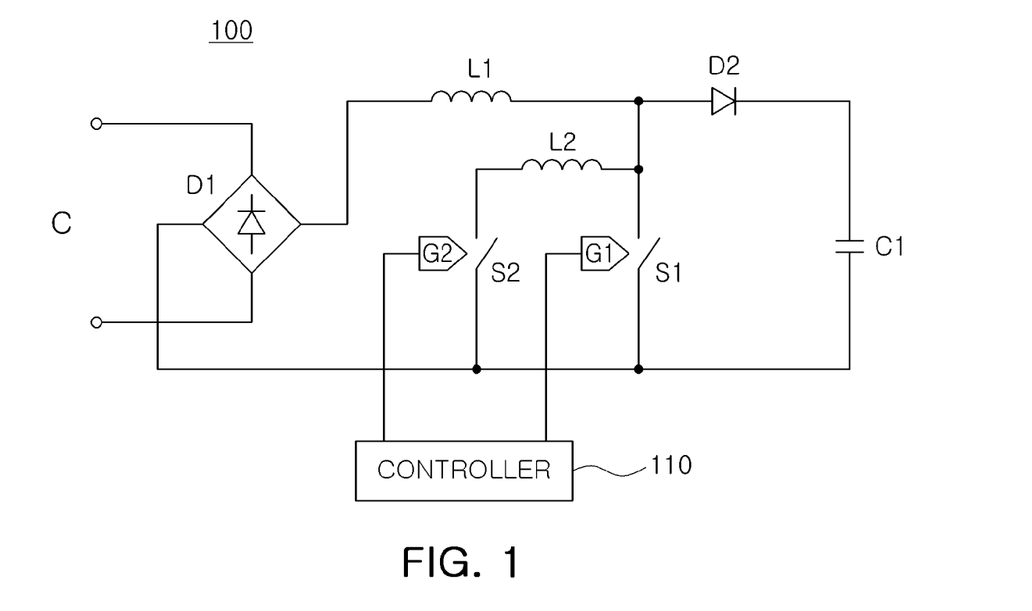
FIG. 1 is a schematic circuit diagram of a power factor correction circuit according to an embodiment of the present invention.

FIG. 1 is a schematic circuit diagram of a power factor correction circuit according to an embodiment of the present invention.

With reference to FIG. 1, a power factor correction circuit 100 according to an embodiment of the present invention may include a main switch S1 and an auxiliary switch S2, and may further include first and second inductors L1 and L2, a diode D2, and a capacitor C1.

The main switch S1 may switch input power and adjust a phase difference between a voltage and a current of the input power to thereby correct a power factor.

The first inductor L1 is connected between an input power terminal and the main switch S1 to accumulate or discharge energy according to switching of the main switch S1. For example, when the main switch S1 is configured as a transistor, the first inductor L1 may be connected between the input power terminal and a collector of the main switch S1.

The input power may be rectified power, and accordingly, a rectifying circuit D1 may rectify alternating current (AC) power and transfer the rectified AC power to the power factor correction circuit.

The auxiliary switch S2 may be connected between the second inductor L2 and a ground, and when the main switch S1 and the auxiliary switch S2 are transistors, the second inductor L2 may be connected between a collector of the main switch S1 and a collector of the auxiliary switch S2.

The diode D1 is connected between the first inductor L1 and an output terminal to provide a transmission path for power output according to switching of the main switch S1, and the capacitor C1 may be connected in parallel to the output terminal to stabilize the output power.

The controller 110 may provide switching control signals G1 and G2 for controlling switching ON and OFF operations of the main switch S1 and the auxiliary switch S2.

The main switch S1 of the power factor correction circuit 100 according to an embodiment of the present invention may switch input power and adjust a phase difference between the voltage and the current of the input power to correct a power factor, and here, the auxiliary switch S2 may form a transmission path for remaining extra power when the main switch S1 is switched on and off.

Figure 2:
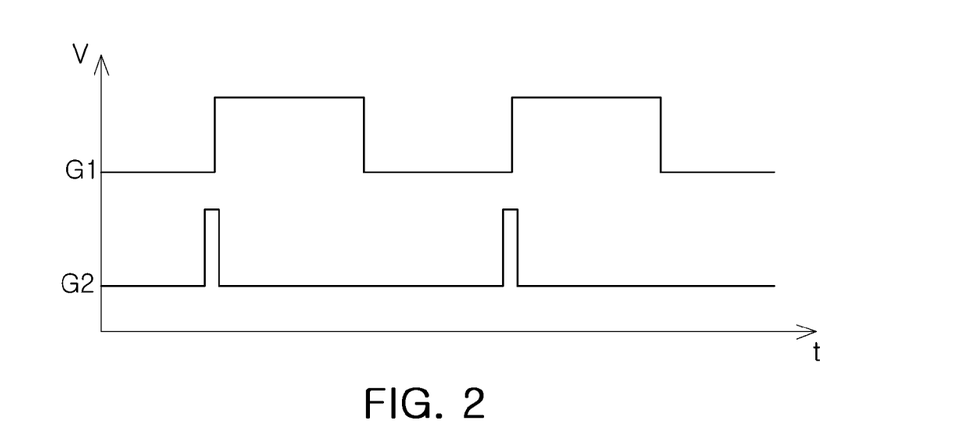
FIG. 2 is a graph of switching control signals of a main switch and an auxiliary switch employed in the power factor correction circuit according to an embodiment of the present invention.

FIG. 2 is a graph of switching control signals of a main switch and an auxiliary switch employed in the power factor correction circuit according to an embodiment of the present invention.

With reference to FIGS. 1 and 2, the auxiliary switch S2 of the of the power factor correction circuit 100 according to an embodiment of the present invention may form a transmission path for the extra power before the main switch S1 is switched on. Namely, the auxiliary switch S2 may allow the extra power to bypass to the ground. To this end, the controller 110 may transfer the switching control signals G1 and G2 for switching on the auxiliary switch S2 before the main switch S1 is switched on. Thereafter, the controller 110 may switch the auxiliary switch S2 on and off before switching the main switch S1 on, or may switch the auxiliary switch S2 on before switching the main switch S1 on and switch the auxiliary switch S2 off after the main switch S1 is switched on.

Meanwhile, the auxiliary switch S2 may form a transmission power of the extra power of the main switch S1 to reduce a switching loss in the main switch S1, but in this case, the switching loss may be generated in the auxiliary switch S2.

Figure 3:
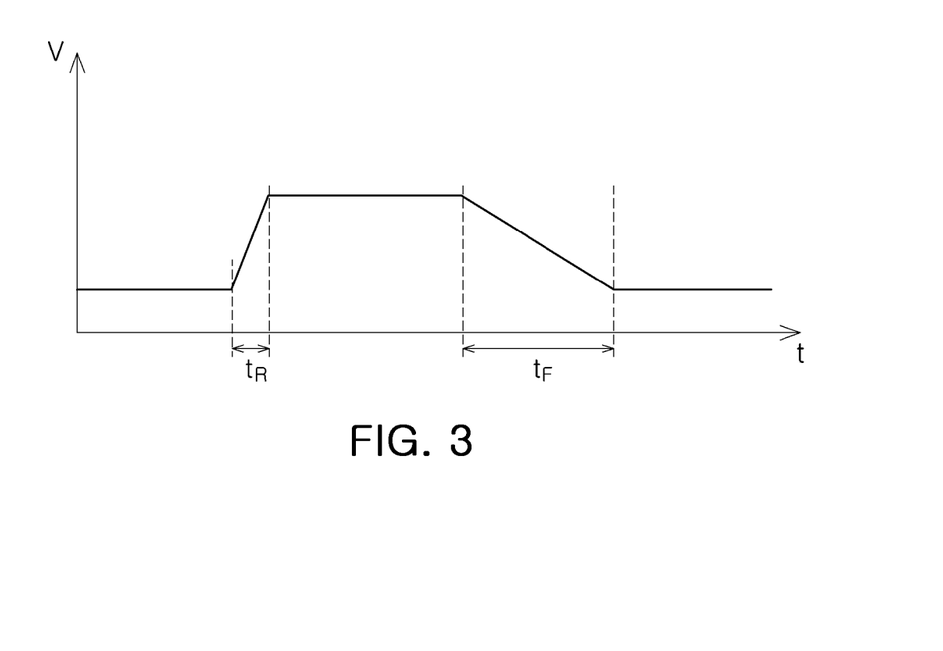
FIG. 3 is a view showing a switching waveform of the auxiliary switch employed in the power factor correction circuit according to an embodiment of the present invention.
Figure 4:
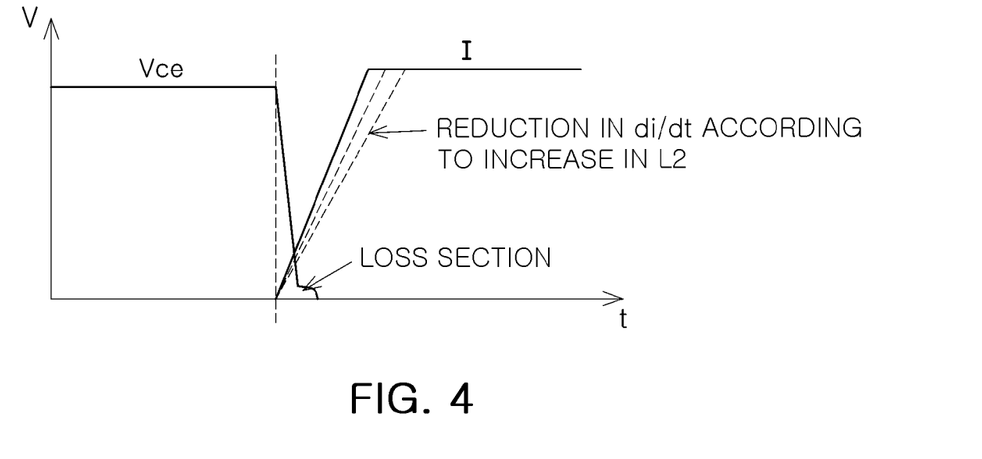
FIG. 4 is a graph showing characteristics of an insulated gate bipolar transistor (IGBT)

FIG. 3 is a view showing a switching waveform of the auxiliary switch employed in the power factor correction circuit according to an embodiment of the present invention, and FIG. 4 is a graph showing characteristics of an insulated gate bipolar transistor (IGBT).

The auxiliary switch employed in the power factor correction circuit according to an embodiment of the present invention may be an IGBT among transistors, and a switching loss in the IGBT may be indicated as an integrated value of multiplication of voltage Vce and current I when the IGBT is switched on. In order to minimize the switching loss in the IGBT, an intersecting section of the voltage Vce and the current I needs to be minimized when the IGBT is switched on.

To this end, when the auxiliary switch S2 is switched on, a di/dt tilt of the current I may be adjusted by the second inductor L2 to minimize a loss section, and when the auxiliary switch S2 is switched off, a falling time is lengthened to reduce a spike voltage by the second inductor L2, thus preventing damage to the auxiliary switch S2. Here, when the falling time of the auxiliary switch S2 is too prolonged, the switching loss in the auxiliary switch S2 may be increased, so that the falling time of the auxiliary switch S2 needs to be set to be within a certain time or shorter.

Figure 5:
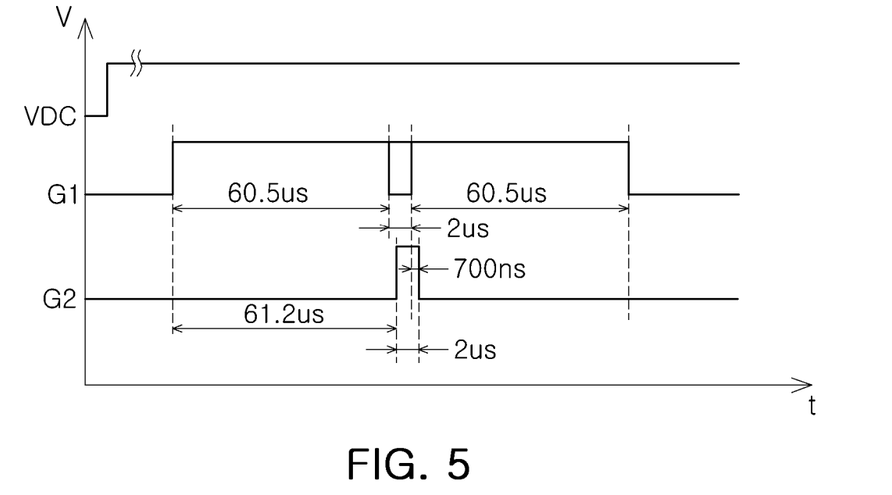
FIG. 5 is a switching timing chart of the main switch and the auxiliary switch employed in the power factor correction circuit according to an embodiment of the present invention.

FIG. 5 is a switching timing chart of the main switch and the auxiliary switch employed in the power factor correction circuit according to an embodiment of the present invention.

With reference to FIG. 5, for example, the controller 110 may provide a switching control signal to set a switching ON section of the main switch S1 to be 60.5 us and a switching OFF section of the main switch S1 to be 2 us. Here, a switching ON section of the auxiliary switch S2 may be set to be 2 us and in this case, a section in which the switching ON section of the main switch S1 and that of the auxiliary switch S2 overlap may be set to be 700 ns.

Figure 6:
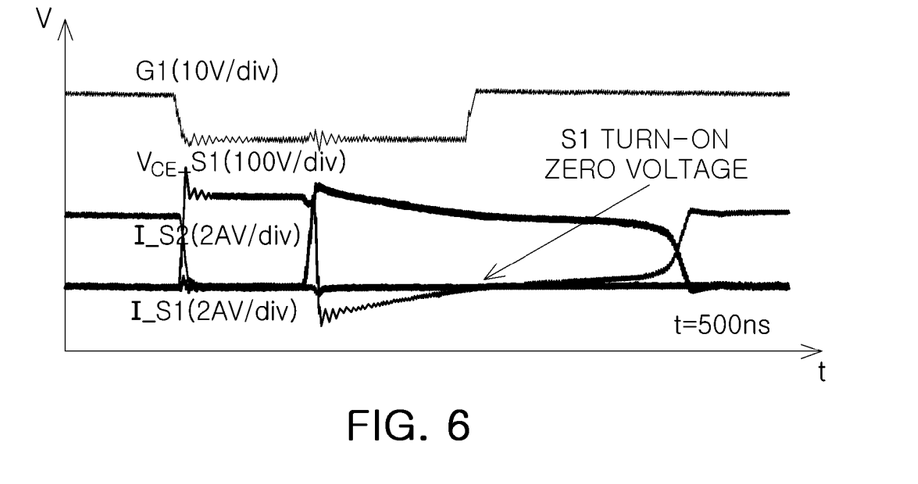
FIGS. 6 and 7 are graphs showing waveforms of a major part of the power factor correction circuit according to an embodiment of the present invention.
Figure 7:
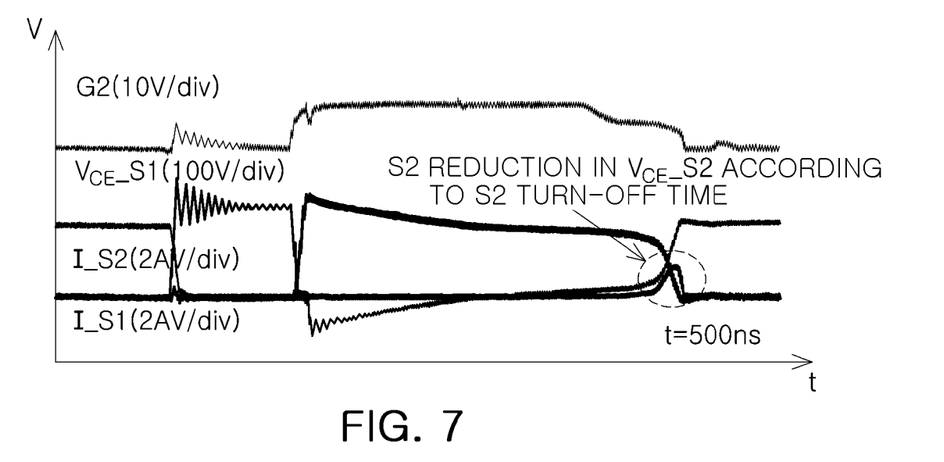

FIGS. 6 and 7 are graphs showing waveforms of a major part of the power factor correction circuit according to an embodiment of the present invention.

With reference to FIGS. 6 and 7, it is noted that, after the auxiliary switch S2 is switched on (a section in which a signal waveform of I_S2 transitions from a low level to a high level), the switching control signal G1 transitions from a low level to a high level at a point at which a current I S1 flowing in the main switch S1 becomes 0, implementing zero voltage switching (ZVS) in the main switch S1. Also, as shown in FIG. 7, it is noted that, a falling time of the auxiliary switch S2 is slackened to reduce a spike voltage generated by the second inductor L2.

Figure 8:
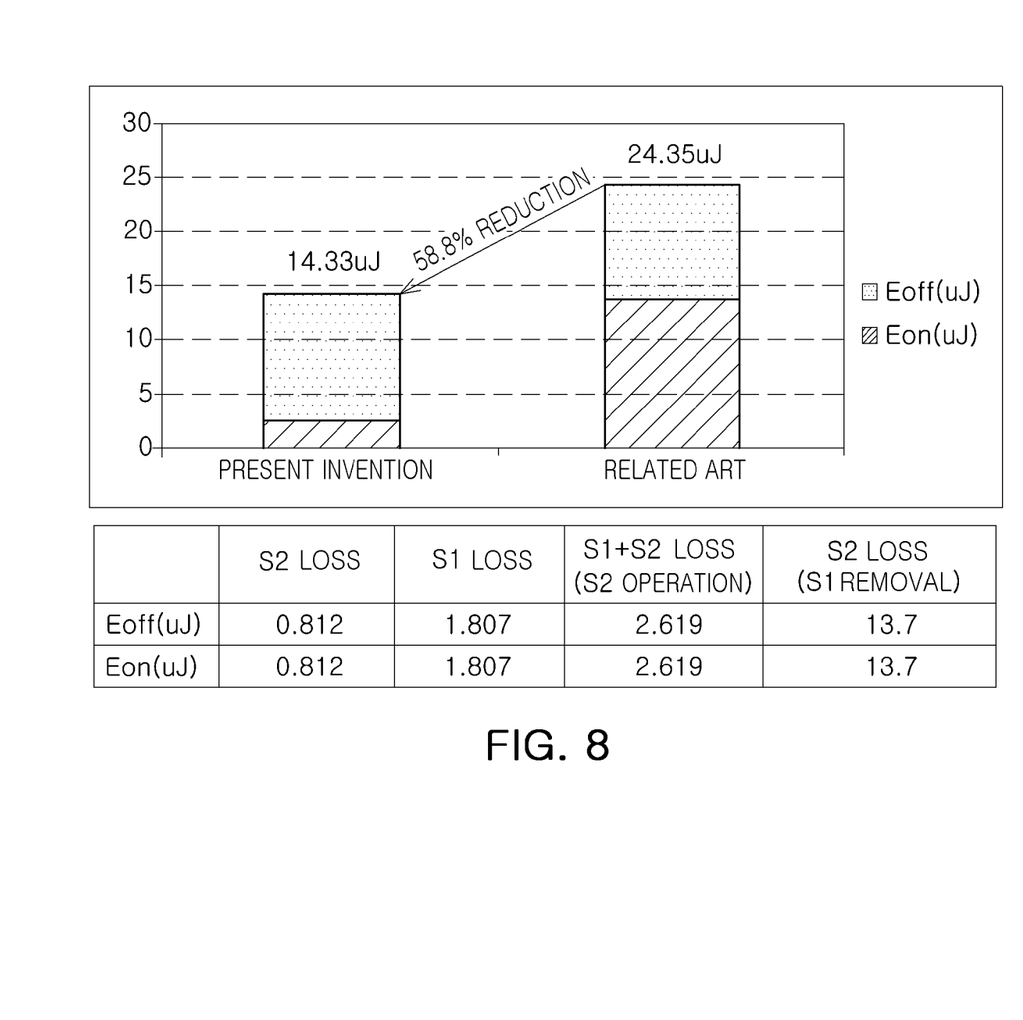
FIG. 8 is a graph showing a comparison in switching loss between the power factor correction circuit of the present invention and that of the related art.

FIG. 8 is a graph showing a comparison in a switching loss between the power factor correction circuit of the present invention and that of the related art.

With reference to FIG. 8, it is noted that the related art power factor correction circuit, without using an auxiliary switch, generates a switching loss of 24.35 uJ, while the power factor correction circuit 100 according to the embodiment of the present invention employing the auxiliary switch S2 forming a transmission path for extra power of the main switch S1 generates a switching loss of 14.33 uJ, having an effect of reducing switching loss by about 58% in comparison to the case of the related art power factor correction circuit.

Figure 9:
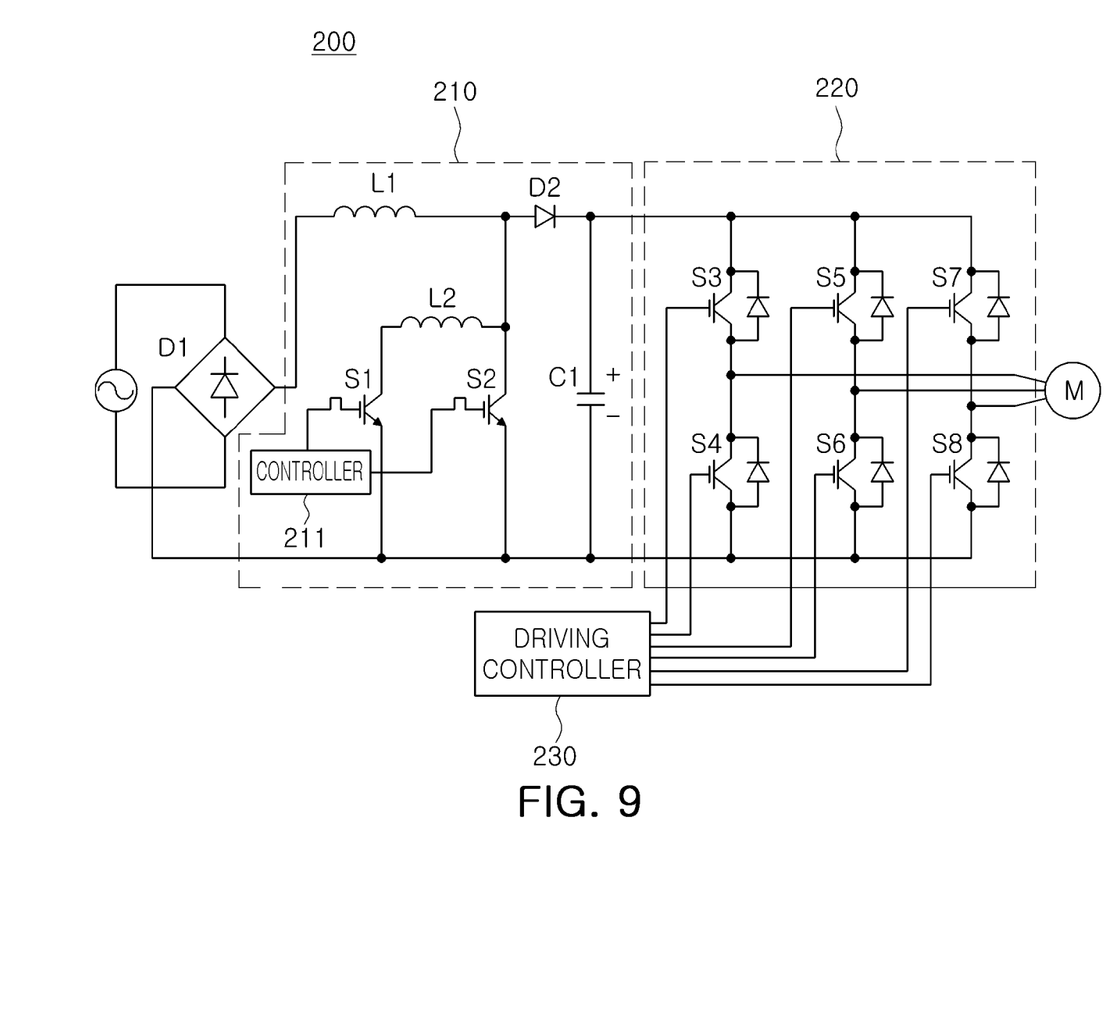
FIGS. 9 and 10 are schematic circuit diagrams of motor driving devices respectively having the power factor correction circuit according to an embodiment of the present invention.
Figure 10:
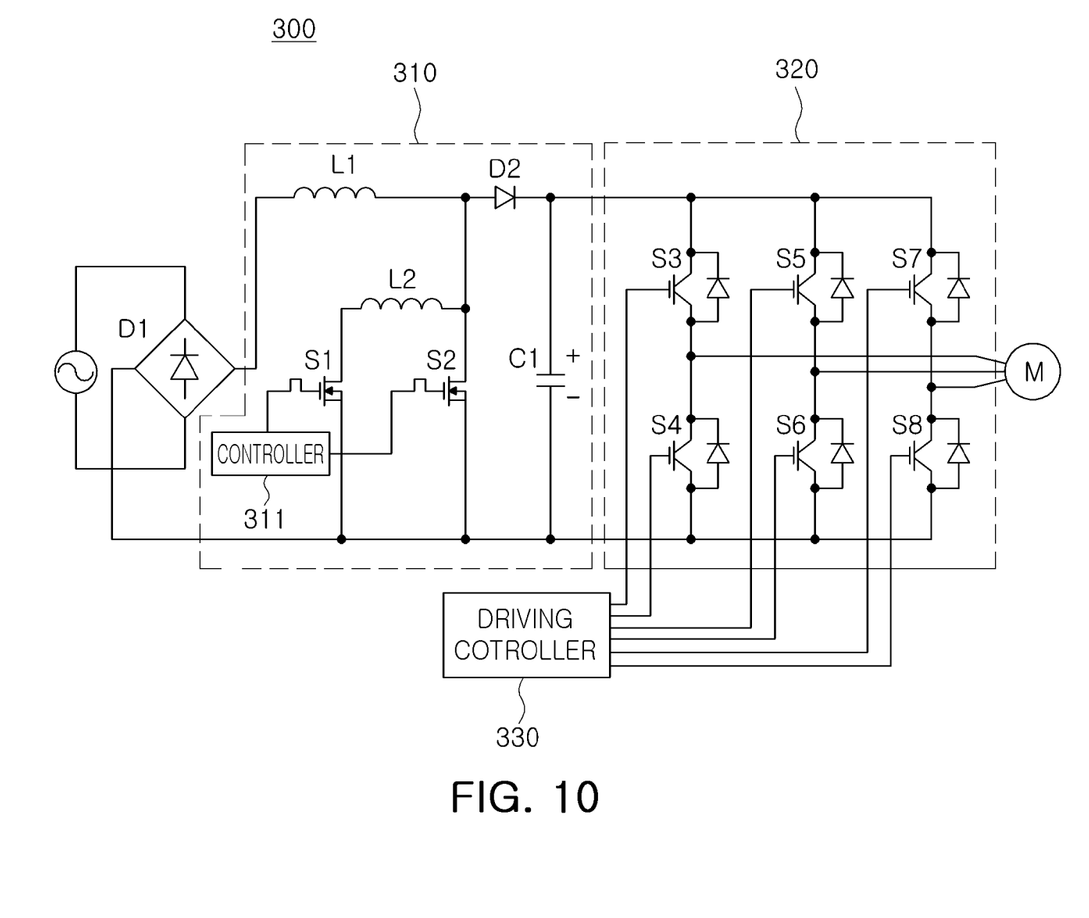

FIGS. 9 and 10 are schematic circuit diagrams of motor driving devices respectively having the power factor correction circuit according to an embodiment of the present invention.

With reference to FIGS. 9 and 10, motor driving devices 200 and 300 according to an embodiment of the present invention may include power factor correction circuits 210 and 310, driving units 220 and 320, and driving controllers 230 and 330. The power factor correction circuits 210 and 310 are the same as the power factor correction circuit 100 illustrated in FIG. 1, so a detailed description thereof will be omitted.

With reference to FIGS. 9 and 10, the main switch S1 and the auxiliary switch S2 of each of the power factor correction circuits 210 and 310 may be configured as an IGBT 210 or a metal oxide semiconductor field-effect transistor (MOSFET) 310.

The driving units 220 and 320 perform switching according to a control signal upon receiving power factor-corrected power from the power factor correction circuits 210 and 310, to drive motors M. Here, an embodiment in which the motors M are driven by supplying 3-phase power is described, but the motors M may also be driven by single-phase power.

The driving controllers 230 and 330 may control switching of the power factor-corrected power from the power factor correction circuits 210 and 310 to control driving of the motors M.

Figure 11:
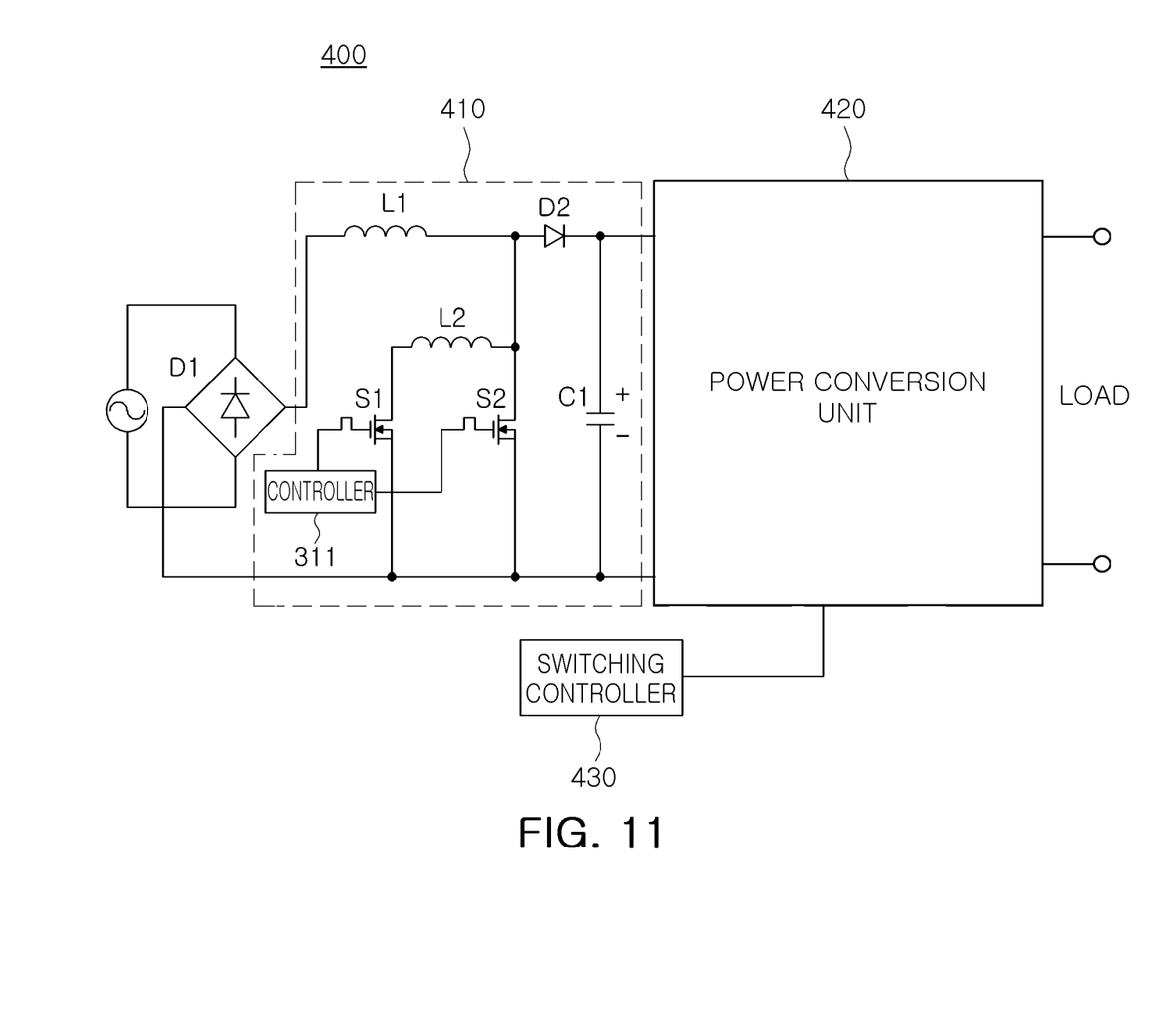
FIG. 11 is a schematic diagram of a power supply device having the power factor correction circuit according to an embodiment of the present invention.

FIG. 11 is a schematic diagram of a power supply device having the power factor correction circuit according to an embodiment of the present invention.

With reference to FIG. 11, a power supply device 400 may include a power factor correction circuit 410, a power conversion unit 420, and a switching controller 430.

The power factor correction circuit 410 is the same as the power factor correction circuit 100 illustrated in FIG. 1, so a detailed description thereof will be omitted.

Also, as shown in FIGS. 9 and 10, the main switch S1 and the auxiliary switch S2 of the power factor correction circuit 410 may be configured as an IGBT or a MOS-FET.

The power conversion unit 420 may switch DC power from the power factor correction circuit 410 and convert the DC power into DC power having a pre-set voltage level to supply the converted DC power to a load, and the switching controller 430 may control switching of the power conversion unit 420 according to the voltage or current level of the output DC power.

As described above, according to embodiments of the present invention, zero voltage switching of power factor correction switching is guaranteed by transferring extra power to a ground before a switching operation for power factor correction, thus reducing a switching loss generated in the power factor correction switching.

As set forth above, according to embodiments of the invention, a switching loss occurring in case of power factor correction switching can be reduced by transferring extra power to a ground before switching operation for a power factor correction.

While the present invention has been shown and described in connection with the embodiments, it will be apparent to those skilled in the art that modifications and variations can be made without departing from the spirit and scope of the invention as defined by the appended claims.

What is claimed is:

1. A power factor correction circuit comprising:
   a main switch switching input power to adjust a phase difference between a current and a voltage of the input power; and
   an auxiliary switch switched on before the main switch is switched on, to thereby form a transmission path for extra power of the main switch,
   wherein a falling time in the case in which the auxiliary switch is switched off is longer than a rising time in the case in which the auxiliary switch is switched on.

2. The power factor correction circuit of claim 1, further comprising:
   a first inductor connected between an input power terminal and the main switch to accumulate or discharge energy according to switching of the main switch; and
   a second inductor connected between a connection terminal of the main switch and the first inductor and the auxiliary switch to adjust the amount of a current flowing in the auxiliary switch when the auxiliary switch is switched on.

3. The power factor correction circuit of claim 2, further comprising:
   a diode providing a transmission path for power discharged from the first inductor according to switching of the main switch; and
   a capacitor stabilizing the power transferred from the diode.

4. The power factor correction circuit of claim 1, wherein the input power is rectified power.

5. The power factor correction circuit of claim 1, wherein the auxiliary switch is switched on and switched off before the main switch is switched on, or is switched on before the main switch is switched on, and switched off after the main switch is switched on.

6. The power factor correction circuit of claim 3, further comprising a controller providing a switching control signal for controlling switching of the main switch and the auxiliary switch.

7. The power factor correction circuit of claim 1, wherein the main switch and the auxiliary switch are at least one of an insulated gate bipolar transistor (IGBT) and a metal oxide semiconductor field-effect transistor (MOS-FET).

8. A power supply device, comprising:
   a power factor correction circuit including a main switch switching input power to adjust a phase difference between a current and a voltage of the input power and an auxiliary switch switched on before the main switch is switched on, to thereby form a transmission path for extra power of the main switch;
   a power conversion unit switching power from the power factor correction circuit to convert the power into pre-set power; and
   a switching controller controlling power switching of the power conversion unit.

9. The power supply device of claim 8, wherein the power factor correction circuit further includes:
   a first inductor connected between an input power terminal and the main switch to accumulate or discharge energy according to switching of the main switch; and
   a second inductor connected between a connection terminal of the main switch and the first inductor and the auxiliary switch to adjust the amount of a current flowing in the auxiliary switch when the auxiliary switch is switched on.

10. The power supply device of claim 8, wherein the power factor correction circuit further includes:

a diode providing a transmission path for power discharged from the first inductor according to switching of the main switch; and a capacitor stabilizing the power transferred from the diode.

11. The power supply device of claim 8, further comprising a rectifying unit rectifying AC power to transfer the rectified AC power to the power factor correction circuit.

12. The power supply device of claim 8, wherein the auxiliary switch is switched on and switched off before the main switch is switched on, or is switched on before the main switch is switched on, and switched off after the main switch is switched on.

13. The power supply device of claim 10, wherein power factor correction circuit further includes a controller providing a switching control signal for controlling switching of the main switch and the auxiliary switch.

14. The power supply device of claim 8, wherein the main switch and the auxiliary switch are at least one of an insulated gate bipolar transistor (IGBT) and a metal oxide semiconductor field-effect transistor (MOS-FET).

15. A motor driving device comprising:
a power factor correction circuit including a main switch switching input power to adjust a phase difference between a current and a voltage of the input power and an auxiliary switch switched on before the main switch is switched on, to thereby form a transmission path for extra power of the main switch;
a driving unit switching power from the power factor correction circuit to drive a motor; and
a driving controller controlling power switching of the driving unit,
wherein a falling time in the case in which the auxiliary switch is switched off is longer than a rising time in the case in which the auxiliary switch is switched on.

16. The motor driving device of claim 15, wherein the power factor correction circuit further includes:
a first inductor connected between an input power terminal and the main switch to accumulate or discharge energy according to switching of the main switch; and
a second inductor connected between a connection terminal of the main switch and the first inductor and the auxiliary switch to adjust the amount of a current flowing in the auxiliary switch when the auxiliary switch is switched on.

17. The motor driving device of claim 16, wherein the power factor correction circuit further includes:
a diode providing a transmission path for power discharged from the first inductor according to switching of the main switch; and
a capacitor stabilizing the power transferred from the diode.

18. The motor driving device of claim 15, further comprising a rectifying unit rectifying AC power to transfer the rectified AC power to the power factor correction circuit.

19. The motor driving device of claim 15, wherein the auxiliary switch is switched on and switched off before the main switch is switched on, or is switched on before the main switch is switched on, and switched off after the main switch is switched on.

20. The motor driving device of claim 17, wherein power factor correction circuit further includes a controller providing a switching control signal for controlling switching of the main switch and the auxiliary switch.

21. The motor driving device of claim 15, wherein the main switch and the auxiliary switch are at least one of an insulated gate bipolar transistor (IGBT) and a metal oxide semiconductor field-effect transistor (MOS-FET).

* * * * *